(12) United States Patent
Luo et al.

(10) Patent No.: US 7,068,495 B2
(45) Date of Patent: Jun. 27, 2006

(54) BATTERY COVER ASSEMBLY FOR PORTABLE ELECTRONIC DEVICE

(75) Inventors: Xinghuang Luo, Shenzhen (CN); Chia-Hua Chen, Tu-Chen (TW); Ying Liang Tu, Shenzhen (CN)

(73) Assignee: FIH Co., Ltd., Shindian (TW)

( * ) Notice: Subject to any disclaimer, the term of this patent is extended or adjusted under 35 U.S.C. 154(b) by 30 days.

(21) Appl. No.: 10/852,763

(22) Filed: May 20, 2004

(65) Prior Publication Data

US 2004/0233653 A1 Nov. 25, 2004

(30) Foreign Application Priority Data

May 20, 2003 (TW) ............................. 92209230 U

(51) Int. Cl.
*H05K 5/02* (2006.01)

(52) U.S. Cl. .................. 361/679; 361/814; 429/96
(58) Field of Classification Search ........ 361/679–687, 361/724–727, 814; 429/96–98; 320/107
See application file for complete search history.

(56) References Cited

U.S. PATENT DOCUMENTS

| 5,436,088 | A | 7/1995 | Castaneda et al. | |
| 6,157,545 | A | 12/2000 | Janninck et al. | |
| 2004/0224221 | A1* | 11/2004 | Chen et al. | 429/96 |
| 2004/0228072 | A1* | 11/2004 | Chen et al. | 361/600 |
| 2004/0229114 | A1* | 11/2004 | Liang et al. | 429/100 |

* cited by examiner

*Primary Examiner*—Hung Van Duong
(74) *Attorney, Agent, or Firm*—Wei Te Chung

(57) ABSTRACT

A battery cover assembly includes a battery cover (3) defining a pair of guide rails (326) therein, a connecting member (2), a housing (1) defining a receiving slot (164) and a battery-receiving compartment (194), a plurality of springs (5, 7), a plurality of sheaths (6), and an antenna rod (4). The connecting member is engaged with the sheaths and is loosely received in the guide rails along a lateral direction. The antenna rod inserts into the receiving slot through the connecting member, the sheaths, and the springs such that the battery cover can rotate about the antenna rod. When the battery cover is rotated downwardly to the housing, a force is required to press the battery cover down upon the housing, and then inwardly along a direction toward the antenna rod until locking projections (302) on the cover catch in troughs (182) defined in the housing.

20 Claims, 5 Drawing Sheets

BATTERY COVER ASSEMBLY FOR PORTABLE ELECTRONIC DEVICE

BACKGROUND OF THE INVENTION

1. Field of the Invention

The present invention generally relates to battery cover assemblies, and more particularly to a battery cover assembly for use in a portable electronic device. The application relates to the copending applications titled "BATTERY COVER ASSEMBLY FOR PORTABLE ELECTRONIC DEVICE" for Rui Hao Chen et al., "BATTERY COVER ASSEMBLY FOR PORTABLE ELECTRONIC DEVICE", for Jian Wu Chen et al., and "BATTERY COVER ASSEMBLY FOR PORTABLE ELECTRONIC DEVICE" for Xiaozhou Wang et al., all of which are assigned to the same assignee with the instant invention.

2. Prior Art

As a power source, batteries are widely used in portable electronic devices, such as personal digital assistants (PDAs), cellular phones and so on. Conventional batteries are attachably received in the electronic devices, and battery covers are designed to connect with housings of the electronic devices to package the batteries. The batteries have to be replaced by opening the battery covers when the batteries are damaged or can not be recharged with electricity any more.

A clasp structure or latch structure is used with a conventional battery cover to engage with a housing of a portable electronic device. For example, a cellular phone marked Alcatel OT310 has a latch for the battery cover. The latch comprises a pair of hooks at one end of the battery cover and a locking pin protruding from the other end of the battery cover. Accordingly, a pair of troughs is defined in an end portion of a backside of a housing of the cellular phone, and a locking hole is defined in the other end portion of the backside of the housing. In assembly, the hooks are firstly inserted into the troughs in the backside of the housing. Then, the battery cover is pressed downwardly to the housing until the locking pin on the battery cover is inserted into the locking hole in the backside of the housing. The battery cover is thus assembled to the housing of the cellular phone. The battery cover is simple in structure, and the engagement between the battery cover and the housing of the cellular phone is firm, too. However, during disassembly, the battery cover is susceptible to being damaged, since a greater force is exerted thereon. As a result, it is inconvenient for a user to change a battery in the housing of the cellular phone.

In addition, most conventional battery covers or battery packages are separate from housings of portable electronic devices. The battery covers need to be opened and taken off when changing batteries, and then the battery covers have to be remounted to the housing after the batteries are changed. During the course of changing the batteries, the disassembled battery covers could be lost due to a user's carelessness.

SUMMARY OF THE INVENTION

Accordingly, an object of the present invention is to provide a battery cover assembly which is convenient for a user to open and close, and for which the battery cover is not susceptible to being lost when it is opened.

To achieve the above-mentioned object, a battery cover assembly includes a battery cover, a connecting member, a housing defining a receiving slot along a longitudinal direction thereof, a plurality of springs, at least a sheath, and an antenna rod secured in the receiving slot. The battery cover has a pair of guide rails defined in an inner side thereof. The connecting member includes a main body, a pair of side wings extending from two sides of the main body, and a folding leg extending downwardly from each side wing. The sheath comprises a tube, a positioning tab, and a stop tab. The connecting member is slidingly received in the guide rails along a lateral direction and is engaged with the sheath by the folding legs inserting between the positioning tab and the stop tab. The battery cover is connected to the housing by the antenna rod inserting through the sheath such that the battery cover is rotated to different positions around the antenna rod. When the battery cover is rotated downwardly to the housing, a predetermined force is required to press the battery cover down, and then a force is required along a direction toward the antenna rod. The battery cover locks into place on the housing when locking projections on the cover engage into troughs on the housing.

DETAILED DESCRIPTION OF THE INVENTION

Figure 1:
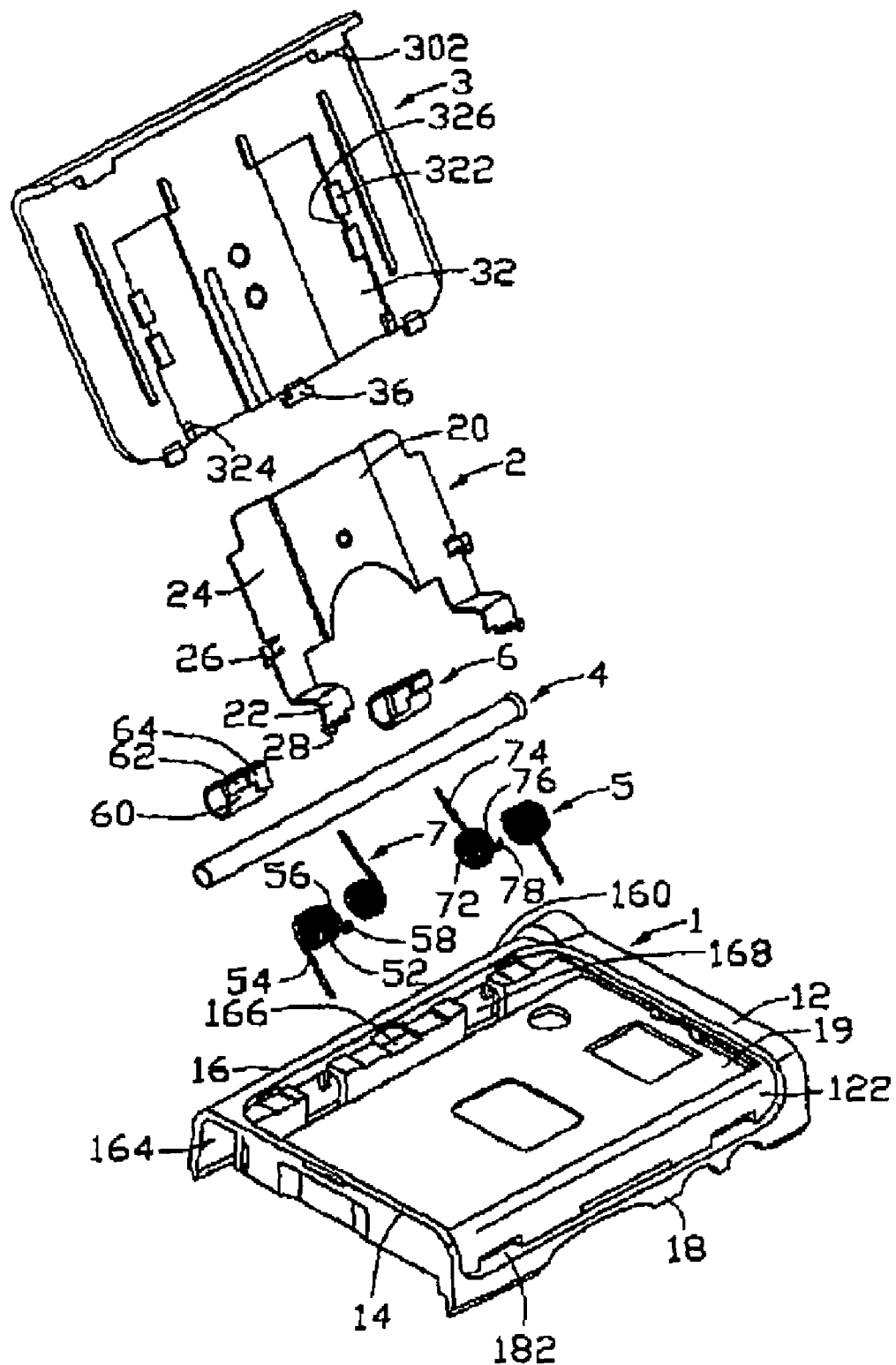
FIG. 1 is an exploded perspective view of a battery cover assembly in accordance with a preferred embodiment of the present invention.
Figure 2:
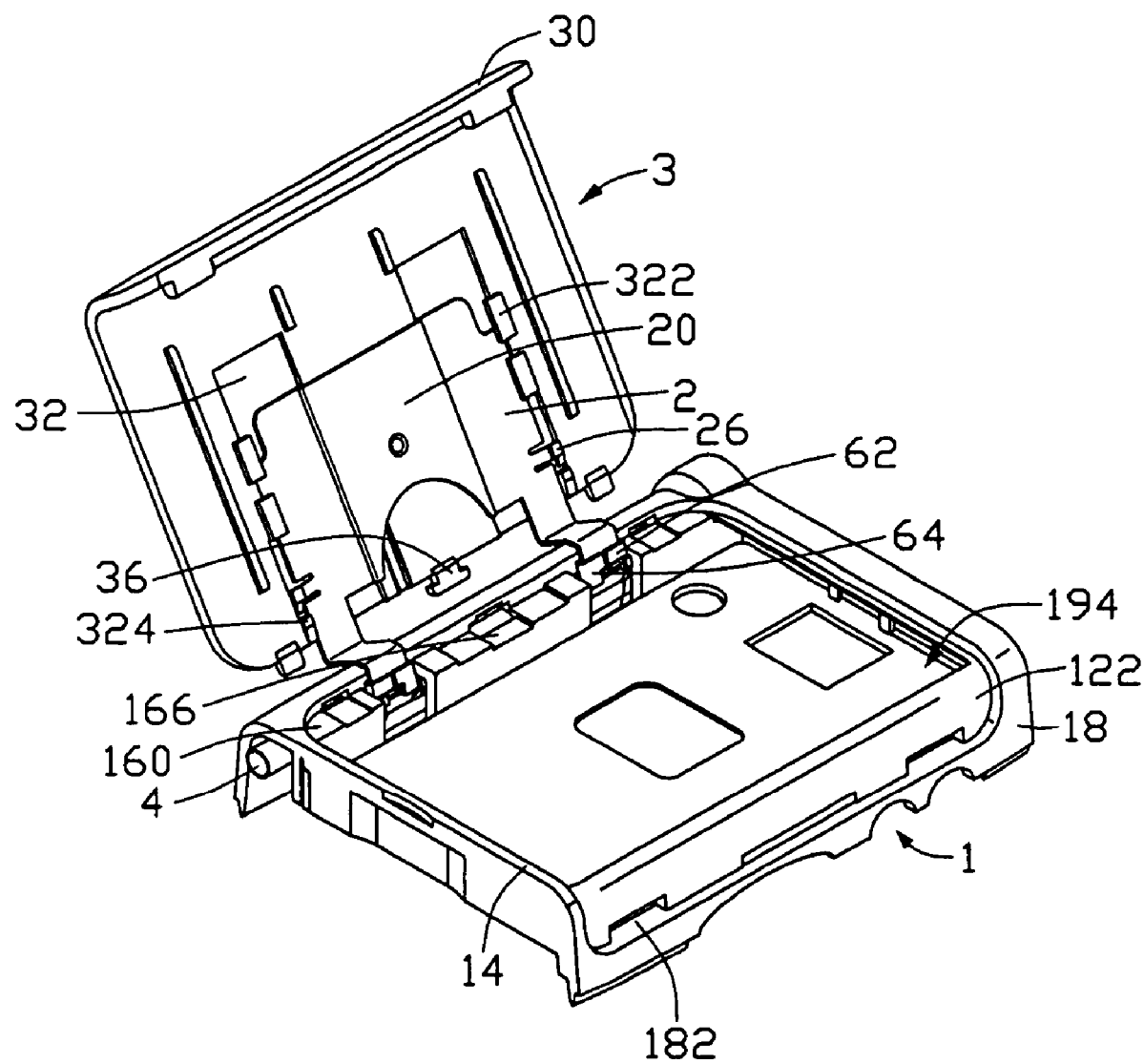
FIG. 2 is a perspective view of an assembled battery cover assembly, in which a cover is in an open position.
Figure 3:
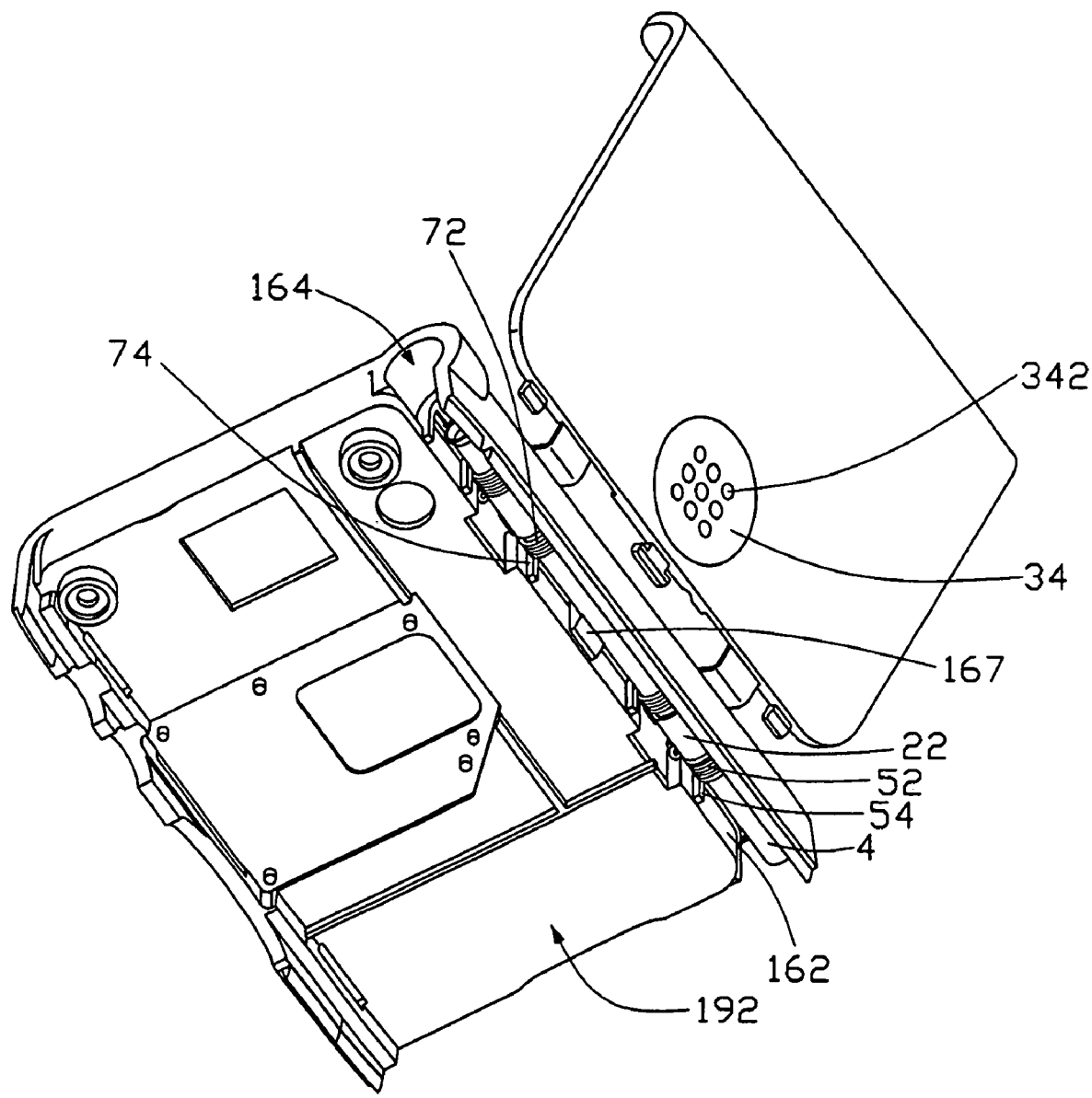
FIG. 3 is a perspective view of the assembled battery cover assembly of FIG. 3, viewed from a different angle.

Referring to FIGS. 1, 2 and 3, a battery cover assembly for use in a mobile phone (not shown) will be taken here as an example to disclose details according to a preferred embodiment of the present invention. The battery cover assembly comprises a housing 1, a connecting member 2, a cover 3, an antenna rod 4, a plurality of springs 5, a plurality of sheaths 6, and a plurality of springs 7.

The housing 1 comprises a top wall 12, a bottom wall 14, a left sidewall 16, and a right sidewall 18 together defining a rectangular space (not labeled). The rectangular space is separated into a first compartment 192 and a second compartment 194 (shown in FIG. 3) by a partition wall 19. The partition wall 19 is formed at an intermediate position between an upper surface (not labeled) and a lower surface (not labeled) of the housing 1. An inner wall 162 protrudes from the partition wall 19, and connects against the left sidewall 16. The first compartment 192 is for accommodating electronic components, such as a printed circuit board therein after assembly of the housing 1 with other housings (not shown) of the cellular phone. The second compartment 194 is used to receive batteries or a battery package therein. The left sidewall 16 and the inner wall 162 define a plurality of mounting grooves 166 and a plurality of rectangular openings 168 therein which alternate with the mounting grooves 166. A receiving slot 164 is defined in the first compartment 192 at a position corresponding to the mounting grooves 166 and the rectangular openings 168, for receiving the antenna rod 4. An elongated recess 122 is defined in an outside surface (not labeled) of the right sidewall 18. A pair of troughs 182 is defined in the recess 122, and the troughs 182 are located near the top wall 12 and the bottom wall 14, respectively. A plurality of positioning projections 167 extends from a bottom of the receiving slot 164.

The connecting member 2 is made of elastic material, such as metal material, by way of stamping. The connecting member 2 comprises a main body 20 and a pair of side wings 24 extending from two opposite sides of the main body 20. The pair of side wings 24 is in one plane, which is lower than the plane of the main body 20. A folding leg 22 extends from a longitudinal end of each side wings 24. A foot portion 28 protrudes from each folding leg 22. An elastic latch 26 is formed on and extends beyond an outside edge of each side wing 24.

Figure 4:
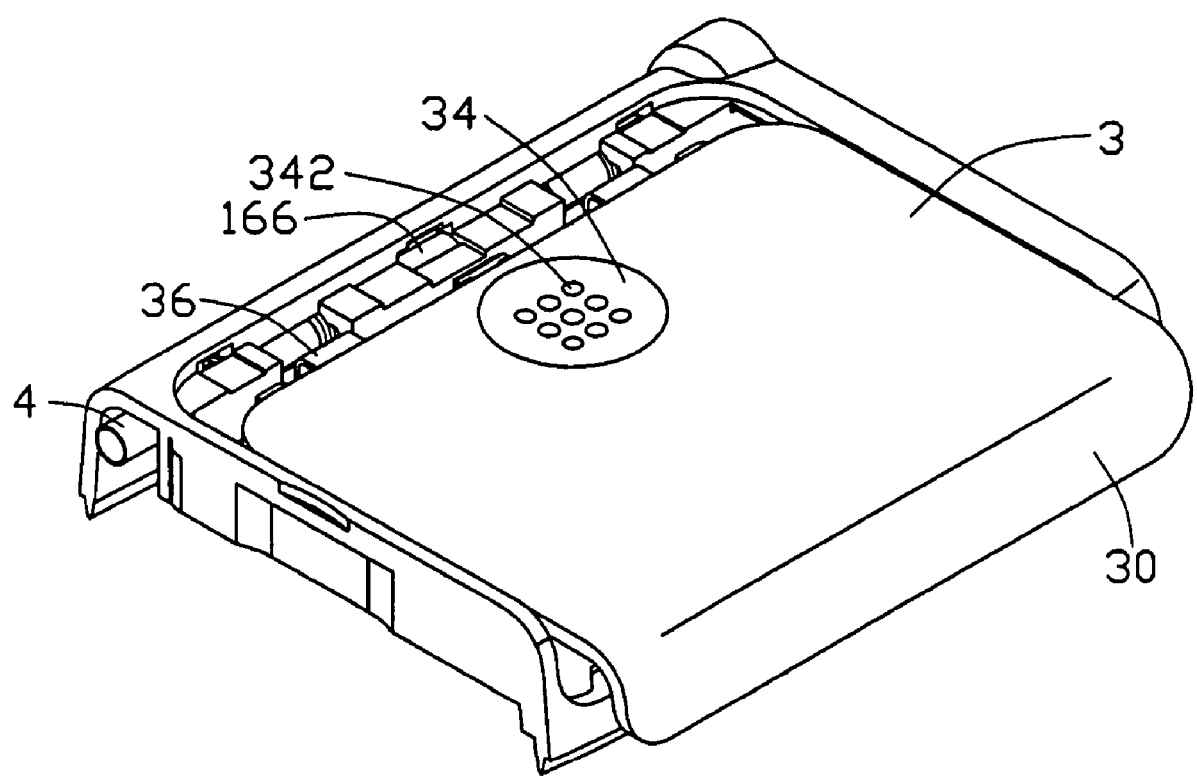
FIG. 4 is a perspective view of the assembled battery cover assembly, in which the cover is about to cover a housing of the battery cover assembly.

The cover 3 is substantially rectangular in shape and comprises a sidewall 30 extending from a longitudinal side thereof. Two parallel, elongated recesses 32 are defined along a lateral direction in an inner side of the cover 3, spaced from each other a certain distance. A plurality of protruding blocks 322 is formed adjacent to an outside edge of each recess 32, protruding from the inner side of the cover 3. The plurality of protruding blocks 322 extends to hang over each recess 32, defining a pair of guide rails 326 for slidably receiving the side wings 24 of the connecting member 2. A block 324 extends from a bottom surface of each recess 32 at a proximal side of the cover 3. A distance from each block 324 to a closest lateral side of the cover 3 is slightly smaller than a distance from an outside edge (not labeled) of the recess 32 to the same lateral side of the cover 3. Two locking projections 302 protrude from an inner surface of the sidewall 30 to engage with the pair of troughs 182 defined in the recess 122 of the housing 1. Referring to FIG. 4, a circular pressing portion 34 is formed on an outside surface of the cover 3, adjacent to a longitudinal side of the cover 3 opposite the side from which the sidewall 30 depends. A plurality of nipples 342 protrudes from an outside surface of the pressing portion 34 to increase a frictional force when the pressing portion 34 is pressed. A plurality of mounting protrusions 36 extends from the side of the cover 3 which is opposite to the sidewall 30.

The antenna rod 4 is hollow and is secured within the receiving slot 164 by a positioning means (not shown). The antenna rod 4 is known in many portable electronic devices which having antennas.

Each spring 5 comprises a coil-shaped body 52, a first end portion 54 extending along a tangent to the coil-shaped body 52, and a second end portion 56 extending parallel to a longitudinal axis of the coil-shaped body 52. A hook 58 is formed on an end of the second end portion 56, for engaging with the foot portion 28.

The sheath 6 comprises a tube 60, a positioning tab 62, and a stop tab 64. The positioning tab 62 and the stop tab 64 extend from ends of the tube 60 and are folded inwardly along an axis of the sheath 6. The positioning tab 62 is confronted with the stop tab 64 to form a groove (not labeled) for receiving the folding leg 22 of the connecting member 2.

Each spring 7 has the same structure as each spring 5. Each spring 7 comprises a coil-shaped body 72, a first end portion 74 extending along a tangent to the coil-shaped body 72, and a second end portion 76 extending parallel to a longitudinal axis of the coil-shaped body 72. A hook 78 is formed on an end of the second end portion 76, for engaging with the stop tab 64.

In assembly, the connecting member 2 is assembled to the cover 3 with the pair of side wings 24 being inserted into the guide rails 326 defined by the protruding blocks 322 and the recesses 32. During the course of inserting the side wings 24 into the guide rails 326, the elastic latch 26 on each side wing 24 is deflected by the block 324 located at an entrance of the corresponding guide rail 326. The elastic latch 26 returns to its original position when each side wing 24 is completely received in the corresponding guide rail 326. The guide rails 326 are slightly longer than that of the side wings 24, so that the connecting member 2 can move back and forth in a small range. However, the connecting member 2 is prevented from moving out of the guide rails 326 by the elastic latches 26 bumping against the blocks 324.

The positioning tab 62 and the stop tab 64 are deflected and the folding legs 22 of the connecting member 2 is placed therebetween. Then, the positioning tab 62 and the stop tab 64 are released to clasp the folding leg 22, with the foot portion 28 maintained underneath the positioning tab 62 and the stop tab 64. The connecting member 2 is thus secured with the sheath 6, since the foot portion 28 can prevent the connecting member 2 from disengaging from the sheath 6.

Next, the hook 58 of the spring 5 clasps the foot portion 28 of the connecting member 2 and the hook 78 of the spring 7 clasps the stop tab 64, and the combined connecting member 2, the springs 5, the sheaths 6, and the springs 7 is then inserted into the rectangular openings 168 defined in the inner wall 162 of the housing 1. After that, the antenna rod 4 is inserted through an entrance of the receiving slot 164, through one of the folding leg 22, through one of the springs 5, alongside the positioning projections 167, through the other folding leg 22, through the sheath 6, through the springs 7, and through the other spring 5. The diameter of the antenna rod 4 is slightly greater than that of the coils of the springs 5 so that a particular tool is required to realize this assembly. The antenna rod 4 is thus secured in the receiving slot 164 by the connecting member 2, the springs 5, and the positioning projections 167.

Figure 5:
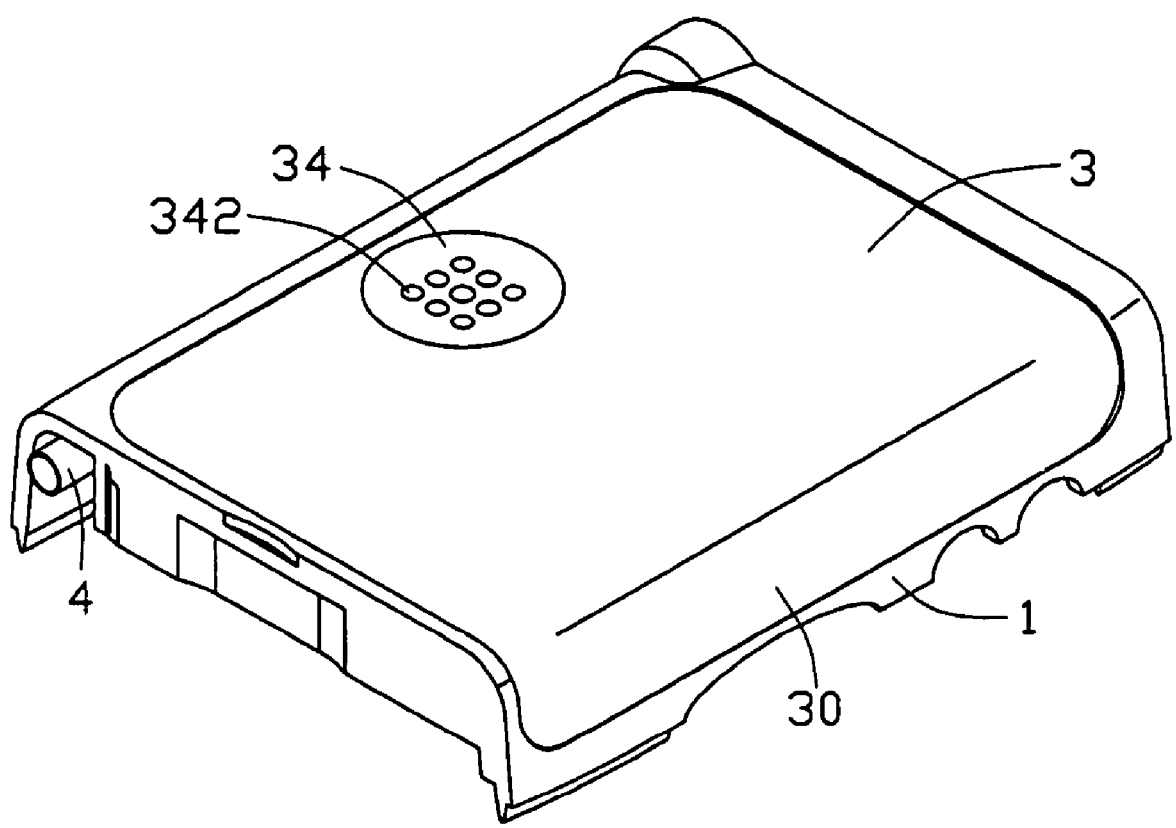
FIG. 5 is a perspective view of the assembled battery cover assembly, in which the cover is in a closed position, covering the housing.

Referring to FIG. 2, a battery package (not shown) is put into the second compartment 194 when the cover 3 is in an open position. Then, the cover 3 together with the connecting member 2 is rotated downwardly about the antenna rod 4 to the housing 1. In this process, a certain force is required to be exerted on the pressing portion 34 of the battery cover 3 to overcome the spring force produced by the springs 5. When the cover 3 is rotated to a status as shown in FIG. 4, wherein the housing 1 is covered by the cover 3. The mounting protrusions 36 are inserted into the mounting grooves 166 and the locking projections 302 are inserted into the troughs 182 when the cover 3 is pushed along a direction toward the antenna rod 4. Referring to FIG. 5, the battery package is thus received in the second compartment 194, and the housing 1 is completely covered by the cover 3, since the sidewall 30 of the cover 3 is received in the recess 122 of the housing 1.

To take the battery package out of the second compartment 194, the pressing portion 34 is pushed to move the cover 3 along a direction away from the antenna rod 4. Then, the mounting protrusions 36 are disengaged from the mounting grooves 166 and the locking projections 302 are disengaged from the troughs 182 when the cover 3 is moved a certain distance relative to the connecting member 2 under the pushing force. Finally, the sheath 6 is rotated along a direction away from the housing 1 at an axis of the antenna rod 4 under the spring force produced by the springs 7 and the cover 3 is rotated back to the open position under the spring force produced by the springs 5. The cover 3 is thus opened and the battery package can be removed.

Compared with other battery cover assemblies in the prior art, the battery cover 3 is not easy as easily lost when it is opened to change the battery package, since the battery cover 3 is rotatably connected to the housing 1. It is also convenient for a user to open and close the battery cover 3.

It is believed that the present invention and its advantages will be understood from the foregoing description and it will be apparent that various changes may be made thereto without departing from the spirit and scope of the invention or sacrificing all of its material advantages, the examples hereinbefore described merely being preferred or exemplary embodiments of the invention.

We claim:

1. A battery cover assembly for use in a portable electronic device, comprising:
    a battery cover;
    a connecting member engaged with said battery cover;
    a housing defining a receiving slot and at least a compartment for accommodating a battery package;
    a rod member received in said receiving slot; and
    at least a sheath engaging with said connecting member; wherein
    said connecting member is connected to said housing by said rod member inserting through the sheath such that said battery cover is rotated to different positions wound said rod member.

2. The battery cover assembly of claim 1, wherein the sheath comprises a tube, a positioning tab, and a stop tab.

3. The battery cover assembly of claim 1, further comprising a plurality of spring members engaging with said rod member and said connecting member.

4. The battery cover assembly of claim 1, wherein said battery cover comprises a sidewall extending from one side thereof.

5. The battery cover assembly of claim 1, wherein an elongated recess is defined along a lateral direction in an inner side of said battery cover, and a plurality of protruding blocks protrudes from the inner side of said battery cover, adjacent to the recess.

6. The battery cover assembly of claim 2, wherein said positioning tab and said top tab extend from ends of said tube, and face each other.

7. The battery cover assembly of claim 2, wherein said rod member is inserted through said tube and secured therein.

8. The battery cover assembly of claim 2, wherein said connecting member comprises a main body, a pair of folding legs extending downwardly from both sides of said main body, and a foot portion extending from each of the folding legs.

9. The battery cover assembly of claim 4, wherein a plurality of locking projections protrudes tarn an inner surface of said sidewall.

10. The battery cover assembly of claim 5, wherein a guide rail is defined by said protruding blocks and the recess.

11. The battery cover assembly of claim 8, wherein said foot portion is secured between said positioning tab and said stop tab.

12. The battery cover assembly of claim 9, wherein said housing is defined by a top wall, a bottom wall, a left wall, a right wall, and a partition wall.

13. The battery cover assembly of claim 12, wherein an elongated recess is defined in an outside surface of said right sidewall, and a plurality of troughs is defined in said elongated recess for receiving said plurality of locking projections of said sidewall of said battery cover.

14. A battery cover assembly for use in a portable electronic device, comprising:
    a battery cover;
    a connecting member being loosely connected to said battery cover;
    a housing comprising a plurality of sidewalls and defining a receiving slot and at least one compartment for accommodating a battery package therein;
    a rod member received in said receiving slot; and
    at least one sheath surrounding said rod member and engaging with said connecting member; wherein
    said connecting member is pivotably connected to said housing by said rod member extending through the sheath.

15. The battery cover assembly of claim 14, wherein a first spring urges the sheath to rotatably move away from said housing, and a second spring urges said connecting member to rotatably move away from the sheath.

16. A battery cover assembly, comprising:
    a battery cover defining a guide rail;
    a connecting member being slidably received in said guide rail along a first direction;
    a housing defining a receiving slot along a second direction substantially perpendicular to said first direction, and at least one compartment for receiving a battery package;
    a rod member secured in said receiving slot; and
    at least one sheath engaging with said connecting member; wherein
    said connecting member is engaged with said housing by said rod member extending through the sheath and through said receiving slot such that said connecting member can rotate about said rod member to different positions.

17. The battery cover assembly of claim 16, further comprising a plurality of spring members engaging with said rod member and said connecting member.

18. The battery cover assembly of claim 16, wherein the sheath comprises a tube, a positioning tab, and a stop tab.

19. The battery cover assembly of claim 17, wherein each of the spring members comprises a coil-shaped body, a first end portion extending along a tangent of the coil-shaped body, and a second end portion extending along a direction parallel to an axis of the coil-shaped body.

20. The battery cover assembly of claim 18, wherein said positioning tab and said top tab extend from ends of said tube, and face each other.

* * * * *